US012756149B2

(12) United States Patent
Breuss

(10) Patent No.: US 12,756,149 B2
(45) Date of Patent: Oct. 6, 2026

(54) ADJUSTING POSITION OF CABLE-END PLUG ACCORDING TO CABLE POSITION

(71) Applicant: HIRSCHMANN AUTOMOTIVE GMBH, Rankweil/Brederis (AT)

(72) Inventor: Lukas Breuss, Rankweil (AT)

(73) Assignee: Hirschmann Automotive GmbH, Rankweil/Brederis (AT)

( * ) Notice: Subject to any disclaimer, the term of this patent is extended or adjusted under 35 U.S.C. 154(b) by 616 days.

(21) Appl. No.: 18/035,738

(22) PCT Filed: Dec. 15, 2021

(86) PCT No.: PCT/EP2021/085939

§ 371 (c)(1),
(2) Date: May 6, 2023

(87) PCT Pub. No.: WO2022/129198

PCT Pub. Date: Jun. 23, 2022

(65) Prior Publication Data

US 2023/0411917 A1 Dec. 21, 2023

(30) Foreign Application Priority Data

Dec. 15, 2020 (DE) ......................... 102020133538.5

(51) Int. Cl.
*H01R 43/20* (2006.01)
*H01R 43/048* (2006.01)

(52) U.S. Cl.
CPC ........... *H01R 43/20* (2013.01); *H01R 43/048* (2013.01)

(58) Field of Classification Search
CPC . H01R 43/20; H01R 43/048; H01R 13/65915
See application file for complete search history.

(56) References Cited

U.S. PATENT DOCUMENTS

| | | | | |
|---|---|---|---|---|
| 9,774,142 | B1 * | 9/2017 | Rust | H01R 43/048 |
| 10,700,480 | B2 * | 6/2020 | Annequin | H01R 13/6473 |
| 2019/0173243 | A1 * | 6/2019 | Annequin | H01R 13/6473 |
| 2022/0200224 | A1 | 6/2022 | Sorg | |
| 2022/0368096 | A1 * | 11/2022 | Sorg | H01R 43/20 |

FOREIGN PATENT DOCUMENTS

| | | | | |
|---|---|---|---|---|
| DE | 102019119468 A | 10/2020 | | |
| DE | 102019130317 A | 10/2020 | | |
| DE | 102020107435 A | 10/2020 | | |
| WO | 2020216835 A | 10/2020 | | |
| WO | WO-2020216835 A1 * | 10/2020 | | H01B 13/012 |

* cited by examiner

*Primary Examiner* — Thomas J Hong
*Assistant Examiner* — Jose K Abraham
(74) *Attorney, Agent, or Firm* — Harness, Dickey & Pierce, P.L.C.; Anthony G. Fussner

(57) ABSTRACT

The invention relates to a method for assembling an arrangement of a plug connector comprising a contact holder at one end of a cable. The position of the plug connector is adjusted to the position of the electrical conductors of the cable to which the plug connector is joined before the cable is press-fit with a sleeve, which partly encloses the contact holder, during the assembly process by means of correcting the alignment of the plug connector. For this purpose, the mounted contact holder must be rotated relative to the electrical conductors. This rotation causes the electrical conductors to be turned over, which leads to a reduction in length between the contact holder and the end of the cable.

15 Claims, 6 Drawing Sheets

| No. | Length at 0° (mm) | Length at 180° (mm) | Diff. |
|---|---|---|---|
| KROSCHU | | | |
| 1 | 66.485 | 65.321 | 1.164 |
| 2 | 61.832 | 60.553 | 1,279 |
| 3 | 63.029 | 61.585 | 1.444 |
| 4 | 65.454 | 64,086 | 1.368 |
| 5 | 64.838 | 64.173 | 0.665 |
| 6 | 63.949 | 62.966 | 0.983 |
| 7 | 62.419 | 61,663 | 0.756 |
| 8 | 62.512 | 61.384 | 1.128 |
| 9 | 64.312 | 62.802 | 1.51 |
| 10 | 61.513 | 60,483 | 1.03 |
| 11 | 63.733 | 62.511 | 1.222 |
| 12 | 62,69 | 61.538 | 1.152 |
| 13 | 58,813 | 57.876 | 0.937 |
| 14 | 61.308 | 59,696 | 1.612 |
| 15 | 62.585 | 61.338 | 1,247 |
| 16 | 65.52 | 64.52 | 1 |
| 17 | 64.5 | 62.933 | 1.567 |
| 18 | 62.972 | 61,82 | 1.152 |
| 19 | 61.381 | 59.878 | 1.503 |
| 20 | 63.593 | 62.293 | 1.3 |
| 21 | 60,572 | 58.946 | 1.626 |
| 22 | 64.113 | 62.903 | 1,21 |
| 23 | 63.062 | 62.287 | 0,775 |
| 24 | 63.189 | 62.033 | 1.156 |
| 25 | 62.675 | 61.712 | 0.963 |
| 26 | 63,88 | 63.021 | 0.859 |
| 27 | 66.596 | 65.383 | 1.213 |
| 28 | 63.063 | 61.853 | 1.21 |
| 29 | 67.758 | 66.475 | 1.283 |
| 30 | 64.712 | 63.847 | 0.865 |
| Arith. Average | | | 1.1726333 |

| NR. | Length at 0° (mm) | Length at 180° (mm) | Diff. |
|---|---|---|---|
| COROPLAST | | | |
| 1 | 14.598 | 14.004 | 0.594 |
| 2 | 12.284 | 11.987 | 0.297 |
| 3 | 62.974 | 62.284 | 0,69 |
| 4 | 61.487 | 61.385 | 1.102 |
| 5 | 12.961 | 12.598 | 0.363 |
| 6 | 11.071 | 10.486 | 0.585 |
| 7 | 11.907 | 11.486 | 0.421 |
| 8 | 10.019 | 9.847 | 0.172 |
| 9 | 12.118 | 11.827 | 0,291 |
| 10 | 61.375 | 60.784 | 0,591 |
| 11 | 65.177 | 64.287 | 0.89 |
| 12 | 61.469 | 60.893 | 0.576 |
| 13 | 63.828 | 63,106 | 0.722 |
| 14 | 58.769 | 58,103 | 0.666 |
| 15 | 67.619 | 67.02 | 0.599 |
| 16 | 62.44 | 61.995 | 0.445 |
| 17 | 64.726 | 64.539 | 0.187 |
| 18 | 65.489 | 65.247 | 0.242 |
| 19 | 62,36 | 61.935 | 0.425 |
| 20 | 62.38 | 61,97 | 0.86 |
| 21 | 63.444 | 62.636 | 0.808 |
| 22 | 66.161 | 65.67 | 0.491 |
| 23 | 62.531 | 61.637 | 0.894 |
| 24 | 63.208 | 62.403 | 0.805 |
| 25 | 64.717 | 64.576 | 0.141 |
| 26 | 63.65 | 63.42 | 0.23 |
| 27 | 64.817 | 63.954 | 0.863 |
| 28 | 63.156 | 58.216 | 0.147 |
| 29 | 58.61 | 63.009 | 0.394 |
| 30 | 63.403 | 62.611 | 0.792 |
| Arith. Average | | | 0.5094333 |

3.3. Strain relief HPS40-2 (Hirschmann)

| | | |
|---|---|---|
| 6mm$^2$ | 24.5±1 | 28.5±1 |
| 4mm$^2$ | 24.5±1 | 28.5±1 |
| 2.5mm$^2$ | 24.5±1 | 28.5±1 |
| Conductor (X-section) | L1 after zero trim (mm) | L1 for Hirschmann HTC4 contact with zero-trim requirement (mm) |

Extract from the twist pitch data sheet:
Overall stranding
1. Position 2 conductors 6.0 mm$^2$
Twist pitch length 100 mm (+/-10)

ADJUSTING POSITION OF CABLE-END PLUG ACCORDING TO CABLE POSITION

CROSS REFERENCE TO RELATED APPLICATIONS

This application is the US-national stage of PCT application PCT/EP21/085939 filed 15 Dec. 2021 and claiming the priority of German patent application 102020133538.5 itself filed 15 Dec. 2020.

The invention relates to a method of assembling a plug connector having a contact holder at one end of a cable, according to the features of the preamble of patent claim 1.

FIG. 9 shows an assembly 1 of plug connectors 3 and 4 each having a contact holder 6 according to the prior art. In this assembly, at a respective end of the cable 2 and adapting the position of the plug connector 3; 4 to the position of the electrical conductors 21 and 22 of the cable 2 to which the plug connector 3; 4 is connected, Due to the lay length of the multiconductor cable 2, the alignment of the plug 3 (on one end of the cable 2) to the plug 4 (on the other end of the cable 2) do not match each other. The orientation specification of the assembly to be mounted with plug connectors (line) on the cable cannot be complied with and leads to problems in final assembly. The line set must be twisted as required in order to be able to be plugged onto the respective mating plug/assembly sockets. The plug connector (socket connector) cannot be rotated relative to the line (to the cable).

The object of the invention is therefore to provide a method for allowing the two plug connectors at opposite ends of the cable to be aligned with each other.

This object is achieved by the features of claim 1.

According to the invention, it is provided that an adaptation of the position of the plug connector to the position of the electrical conductors of the cable to which the plug connector is connected occurs prior to crimping a sleeve onto the cable to attach the contact holder during the manufacturing process by correcting the alignment of the plug connector, for which purpose the mounted contact holder has to be rotated relative to the electrical conductor as a result of this twisting, the electrical conductors are twisted together, which leads to a reduction in length between the contact holder and the end of the cable.

Before crimping the sleeve onto a part of the contact holder and the end of the cable, a correction of the alignment of the plug connector can take place during the manufacturing process. For this purpose, the mounted contact holder must be rotated relative to the line. This twisting results in a twisting together of the individual lines, which leads to a reduction in length between contact holder and strain relief (formed by the sleeve pressed onto the end of the cable). After crimping, the plug-in face of the one plug-in connector is thus aligned in a positionally correct manner with respect to the plug-in face of the second plug-in connector. Such an assembled assembly can be installed in an advantageous manner as intended, since the plug faces of the mating plug connectors (for example on an electronic device, cannot be changed or adapted due to their stationary installation, assembly connection or the like.

In a further development of the invention, it is provided as a first solution that the method is carried out without an influence on process parameters and parts design, so that a rotation by ±10° is permissible on account of the tolerance design of the process and part tolerances. Depending on the design, the rotation can also be up to 25% more or less±10°.

In a further development of the invention, it is provided as a second solution that the method is carried out with influence on process parameters, but without influence on parts design, and the expected length reduction by the rotation has already to be provided during the removal (stripping) of the outer jacket of the cable and must be calculated. In this case, the influence of the temporarily longer cladding length on old intermediate steps must be considered. For example, in the sequence: mounting and fixing the strain relief (compression of the sleeve on the cable sheath), contacts (for example the applicant's own HCT4 crimp), mounting of the contact holder. When the plug-in connector is rotated (relative to the line), it must be taken into account that the line is pulled into the sleeve (in particular the shielding sleeve) by twisting together of the strands.

In a further development of the invention, it is provided as a third solution that the method is carried out with influence on process parameters and influence on parts design, and the maximum expected length reduction must be provided by the maximum defined rotation of ±180° in the tolerance of the individual parts and in the process steps.

In this case, the cladding length is reduced to a measure for all angular adjustments. However, the strain relief must be extended to compensate for the changes in length by twisting. The sleeve (in particular the shield sleeve) must also be adapted to ensure all possible crimp positions. Optionally, the position of the tools of the pressing must also be modified. An examination of the length reduction and its influence on the part design as a function of the angle of rotation was carried out.

In a further development of the invention, it is provided that the sleeve is formed as a shield sleeve made of an electrically conductive material (as already mentioned in part above) and is pressed via a shielding, in particular a shielding braid, of the cable. The shielding of the cable is contacted by the shielding sleeve to the contact holder and/or a mating plug connector into which the plug connector is inserted, so that a continuous shielding is realized via a plugged-together plug connection. In addition, the shielding of the cable in cooperation with the sleeve (shielding sleeve) can cause strain relief in order to absorb tensile and compressive forces acting on the plug connector and/or the cable.

The method according to the invention and the prior art are described below and explained with reference to the drawing.

FIG. 1 shows an assembly 1 and how it is put together. The assembly 1 comprises a cable 2, here with two electrical conductors 21 and 22. The number of electrical conductors of the cable can also be larger. A contact 5, for example a clip, is mounted on the end of each of the electrical conductors 21 and 22. Each contact 5 is held in a respective contact chamber of a contact holder 6

The invention is characterized in that: The contact holder 6 is in turn inserted into a housing that completes the first plug connector 3, although this is not shown in FIG. 1, but is realized in practice. This can be seen in the upper view of FIG. 1.

The middle view shows how a sleeve 7 is pushed onto the cable 2, and this sleeve 7 can be compressed onto the outer jacket of the cable 2, which, however, is not yet effected in this view. It is important in the embodiment of the method that the cable 2 is held in a stationary manner and holder 6 is rotated by a device relative to the fixed cable 2 such that a correction of the alignment of the plug connector (here of the first plug connector 3) takes place during the manufacturing process. This correction of the alignment is to be understood as meaning that the plug face of the first plug connector 3 is angularly aligned correctly with respect to the plug face of the further plug connector 4.

After this correction of the alignment is effected, it is necessary to fix the position of the aligned contact holder 6 with respect to the fixed cable 2. This takes place according to the lower view in FIG. 1 in that the sleeve 7 is compressed inward so that where the sleeve 7 that encloses a part of the contact holder 6 and a part of the cable 2, the position of the contacts 5 within the contact holder 6 is fixed with respect to the cable 2.

In this embodiment, FIG. 1 shows, when carrying out the method according to the invention, on account of the tolerance design of the process and part tolerances that rotation by plus/minus 10° is permissible. In practice, this rotation can also vary by plus/minus 25%.

FIG. 2 shows the implementation of the method according to the second solution, in which the process parameters have an influence when carrying out the method, but the part design is not taken into account. The expected length reduction due to the rotation between the contact holder 6 and the cable 2 must already be provided and included in the stripping off of the outer jacket of the cable 2. In this regard, reference is made in advance to FIG. 5.

FIG. 3 shows the implementation of the method according to a third solution, in which the process parameters and the part design have an influence on the performance of the method. The maximum expected length reduction due to the maximum defined rotation by plus/minus 180° must be provided in this solution in the tolerance of the individual parts and of the process steps. In this case, it is essential that the length of the stripping is reduced to a dimension for all rotations. The strain relief (formed by the region of the sleeve 7 that is pressed onto the end of the cable 2), must be extended in order to absorb (compensate) for changes in length caused by the twisting. The sleeve 7, in particular the sleeve formed as a shield sleeve, must also be adapted in order to ensure possible compression positions, in particular braid compressing positions. In addition, the position of the tools for pressing the sleeve 7 must be adapted FIG. 4 shows attempts made to evaluate the change in length by rotation through 180°. In order to find the maximum change in length, measurement tests were carried out on two different line types (30 measurements per line type). In the tables shown, the measured values are listed. Maximum values of both experiments are stored in dark red (maximum 1626 mm). As can be seen from the tables, the measured values vary widely, i.e. there is no linear relationship between the change in length and the angle of rotation. The values mentioned in the tables are, for example, are for but not limited to a specific embodiment, so that they can also vary up and/or down according to the part design.

FIG. 5 shows, in the upper view, the assembly of the contact 5 that is attached to an electrical conductor and has already been inserted into its associated contact chamber in the contact holder 6, before rotation in order to adapt the plug faces. It can be clearly seen here that the front end of the cable 2 and the front end of the contact holder 6 facing it have a greater spacing than is established after the adjustment of the plug faces by rotation. This means that this distance has become smaller after the rotation and is therefore to be taken into account. This can be seen very well in the lower view in FIG. 5.

For a specific embodiment, this means the following: In order to cover the measured length changes in any case, a change in length of, for example, 2 mm (millimeters) is provided. For this purpose, the following components and process dimensions must be adapted: the strain relief is extended by, for example, 2 mm (component). The jacket length is shortened by, for example, 2 mm (process). The position of the compression, in particular the braid compression is offset by, for example, 2 mm.

As a result of these changes, the compression tool for pressing the sleeve 7 (in particular the shielding sleeve) has to be displaced, for example, 2 mm toward the plug-in face (plug interface). In the tolerance calculation, it was ensured that the compression tool (despite the changed geometry and taking into account the change in length) is completely seated over the strain relief and thus the sleeve 7 (shield sleeve) is compressed cleanly.

In FIGS. 6 to 8, a part of the process is shown with respect to a third solution.

FIG. 9 shows an embodiment according to the prior art. The assembly 1 comprises a cable 2 whose length is selected according to its application. A first plug connector 3 and a further plug connector 4 mounted on the opposite ends of the cable 2. In this prior art, the cable 2 comprises two electrical conductors 21 and 22 and can be unshielded or shielded. The first and the second plug connectors 3 and 4 each have a contact holder (identified at reference 6 in the preceding figures), and a first contact 31 and a further contact 32 of the first plug connector and a first contact 41 and a further contact 42 of the further plug connector 4 are inserted in respective contact chambers of the contact holders. These contacts, referred to above, are electrically connected to the respective ends of the first electrical conductor 21 or the further electrical conductor 22. The number of electrical conductors or their contacts can also be greater.

The method according to the invention that is illustrated, for example, in alternatives in FIGS. 1 to 3, is basically based on the assembly 1, as shown in FIG. 9.

LIST OF REFERENCE SIGNS

Figure 1:
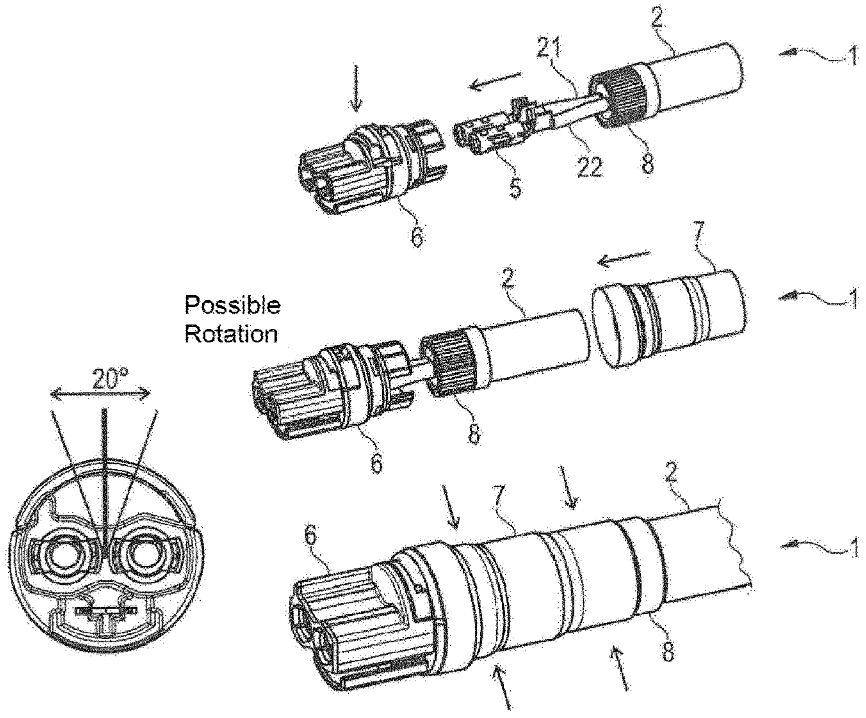
FIG. 1 shows a method of assembling an assembly (1) of a plug connector (3, 4) according to a first solution. The assembly (1) comprises a cable (2) with two electrical conductors (21, 22) A contact (5) is mounted on the end of each of the electrical conductors (21, 22). Each contact (5) is held in a respective contact chamber of a contact holder (6).
Figure 2:
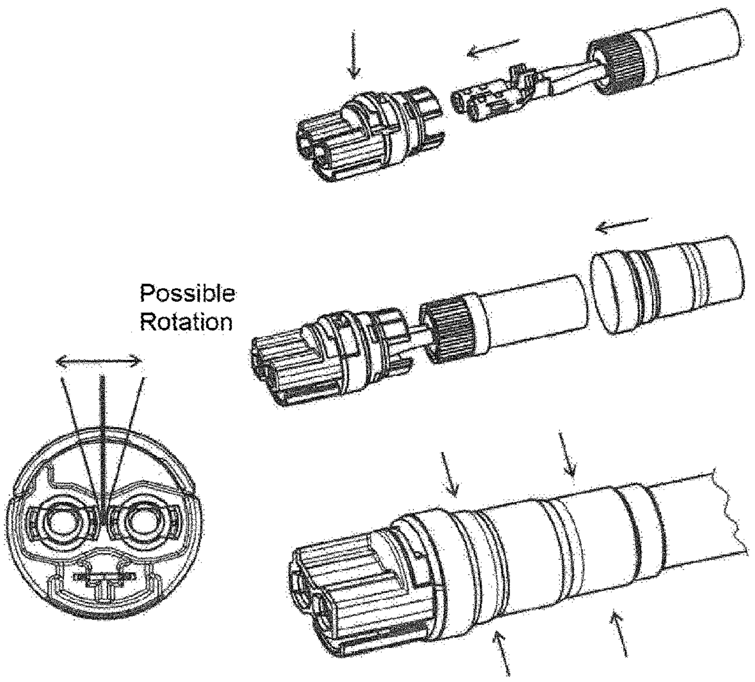
FIG. 2 shows an implementation of a method of assembling the assembly of the plug connector according to a second solution in which the process parameters have an influence when carrying out the method but the part design is not taken into account.
Figures 3, 4:
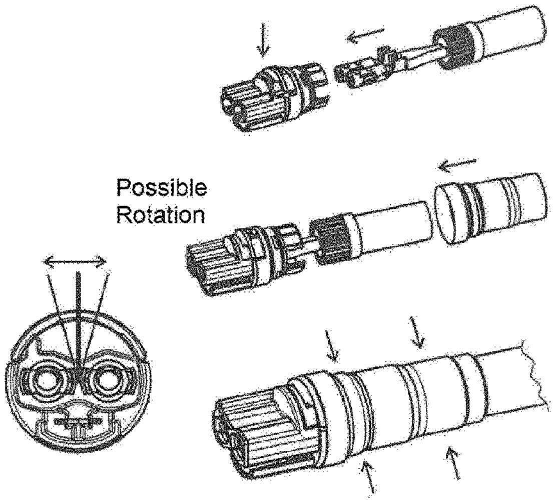
FIG. 3 shows an implementation of a method of assembling the assembly of the plug connector according to a third solution in which the process parameters and the part design have an influence on the performance of the method.
FIG. 4 includes a table of measured values from attempts made to evaluate the change in length by rotation through 180°.
Figure 5:
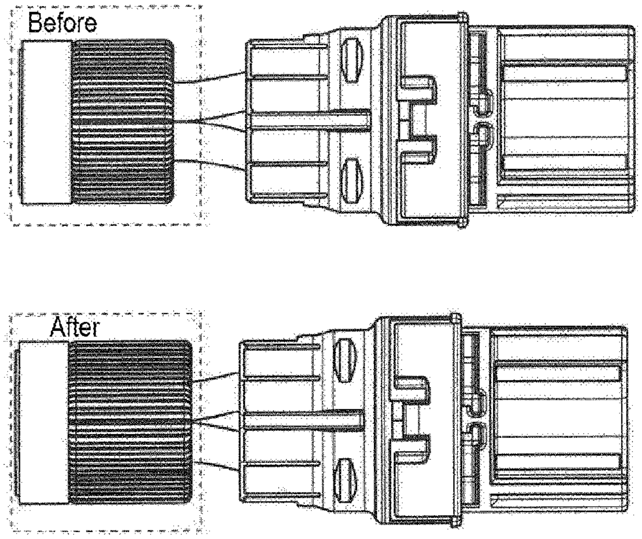
FIG. 5 is an upper view of the assembly of the contact (5) that is attached to an electrical conductor and has already been inserted into its associated contact chamber in the contact holder (6) before rotation in order to adapt the plug faces.
Figure 6:
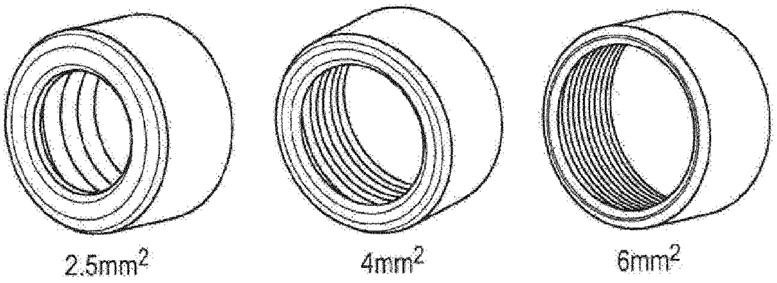
FIGS. 6, 7, and 8 show parts of the process for assembling the assembly of plug connector with respect to a third solution.
Figure 6:
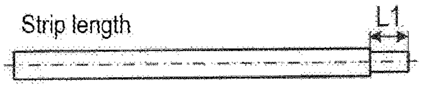
Figure 6:
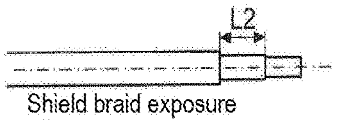
Figure 6:
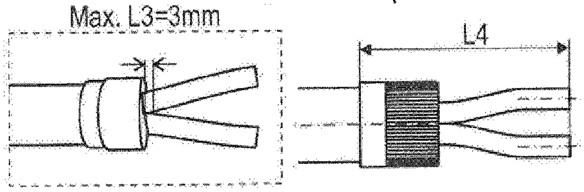
Figure 7:
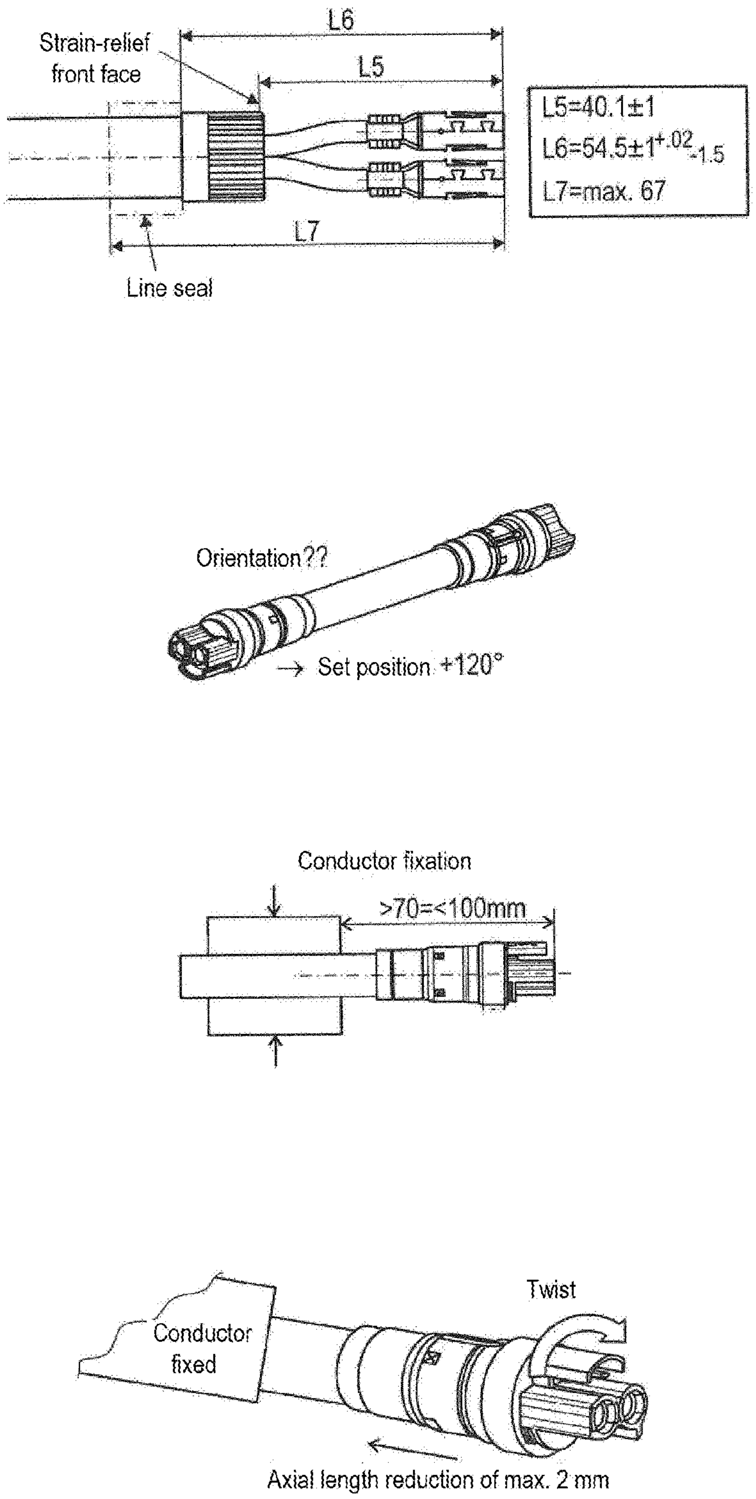
Figure 8:
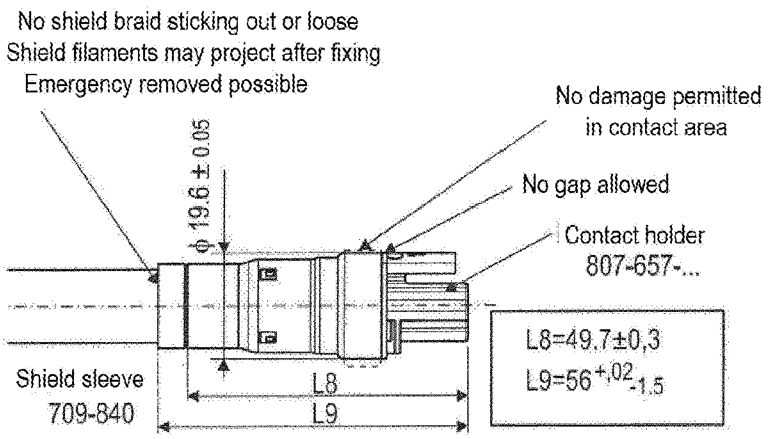
Figure 8:
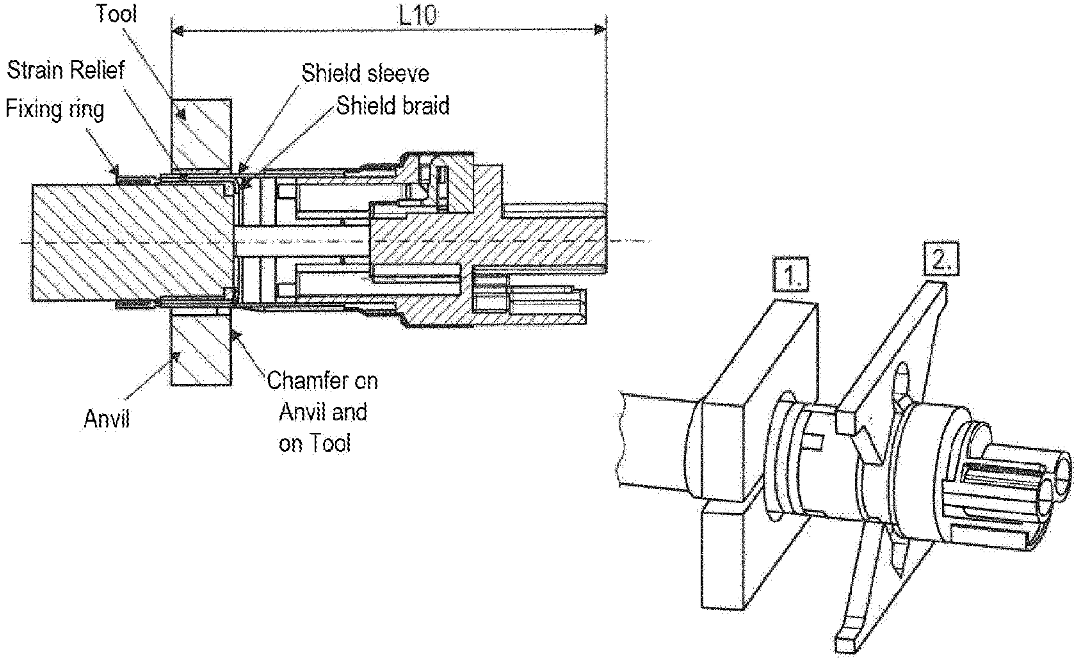
Figure 9:
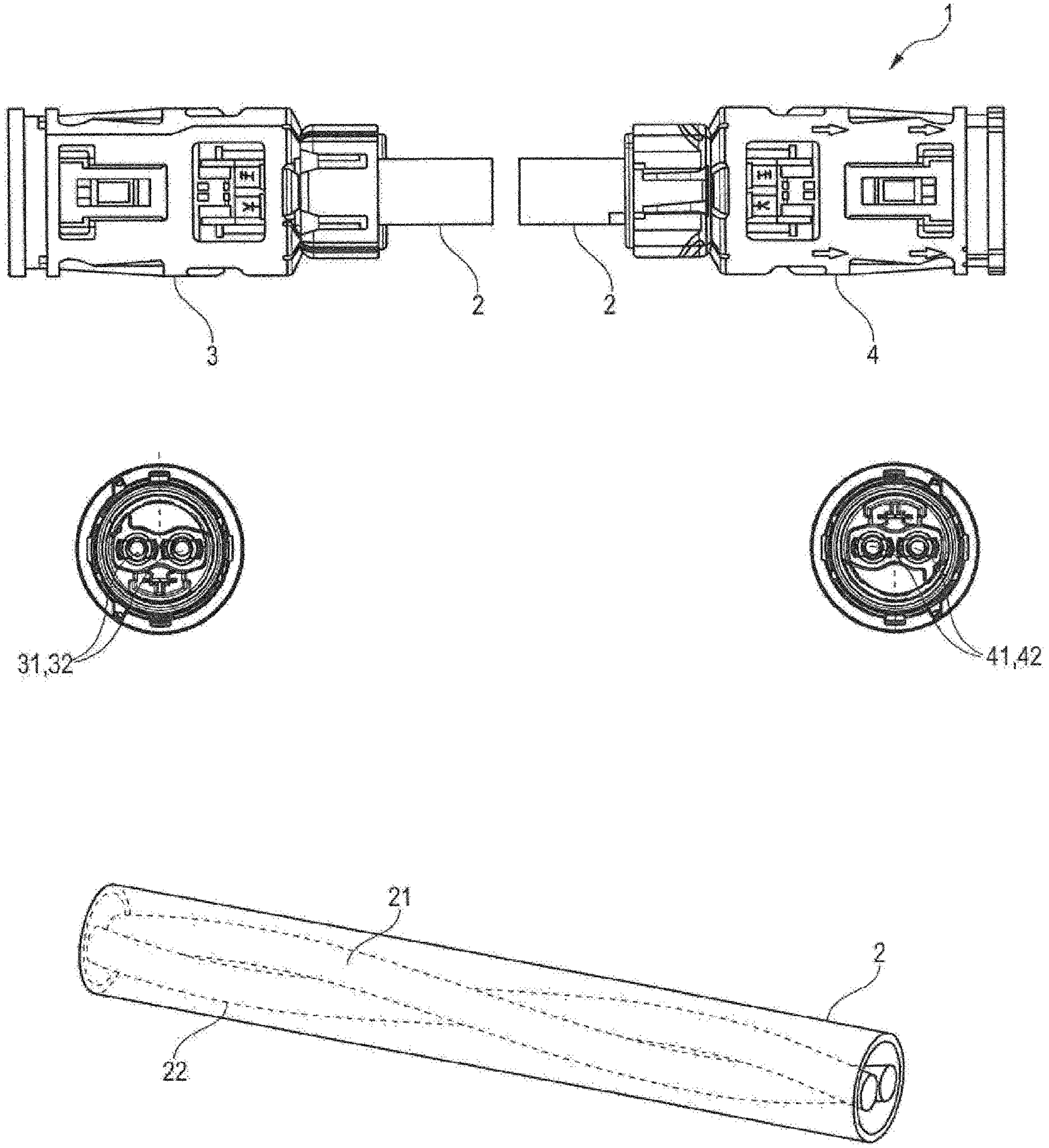
Fig. 9 (Prior Art)
FIG. 9 shows an assembly (1) of plug connectors (3, 4) each having a contact holder (6) according to the prior art.

1 Assembly
2 cable
21 first electrical conductor
22 further electrical conductor
3 first plug connector
31 first contact
32 further contact
4 further plug connector
41 first contact
42 further contact
5 contact
6 Contact holder
7 Sleeve (in particular shielding sleeve)
8 Shielding (in particular shielding braid)

The invention claimed is:

1. A method of making an assembly comprising a multi-conductor cable having an outer jacket and a plurality of electrical conductors, a contact holder at one end of the cable, and a sleeve that partially surrounds the contact holder, the method comprising:

(a) axially pre-positioning the sleeve prior to any rotational adjustment of the contact holder such that the sleeve overlaps both a rear portion of the contact holder and a forward portion of the outer jacket;

(b) with the cable held against rotation, rotating the contact holder relative to the electrical conductors to correct an angular orientation of a plug connector defined by the contact holder, wherein the rotation twists the electrical conductors and draws a shield braid of the cable such that the shield braid is displaced axially under the pre-positioned sleeve, thereby producing a measurable axial length reduction (ΔL) between the contact holder and the cable end; and (c) without axially translating the pre-positioned sleeve from the overlapped position established in step (a) and after the rotation of the contact holder in step (b), crimping the sleeve in a pressing operation over the shield braid and the contact holder to mechanically fix the angular orientation and establish continuous EMI shielding through the sleeve.

2. The method according to claim 1, wherein the method is carried out without materially affecting process parameters and parts design, so that a rotation by +/−10° is permissible based on predefined assembly tolerances.

3. The method according to claim 1, wherein the method is carried out with adjusted process parameters and without changing parts design, and wherein the expected ΔL from step (b) is predetermined and compensated by increasing a conductor stripping length during removal of the outer jacket at the cable end prior to step (a).

4. The method according to claim 1, wherein the method is carried out with adjusted process parameters and modified parts design, including repositioning a compression tool for the sleeve toward a plug interface by the compensated ΔL, so that crimp locations remain fully seated over the strain relief.

5. The method according to claim 1, wherein the sleeve is a conductive shield sleeve crimped over a folded-back shield braid of the cable and electrically coupled to the contact holder and/or a mating connector to provide continuous shielding across a mated interface.

6. A method of making an assembly comprising a multi-conductor cable having an outer jacket and conductor ends projecting therefrom, respective contacts on the conductor ends of conductors of the cable, a holder receiving the contacts, and a conductive shield sleeve at least partially surrounding the holder and extending back over the outer jacket, the method comprising the steps of:

(i) axially pre-overlapping the conductive shield sleeve over both the holder and the outer jacket prior to any rotational adjustment of the holder;

(ii) while maintaining the cable in a non-rotating condition, rotating the holder relative to the conductors to a target angular orientation, thereby twisting the conductors and drawing a shield braid of the cable such that the shield braid is displaced axially beneath the pre-overlapped conductive shield sleeve, resulting in an axial shortening of a length of the assembly; and (iii) after the rotation of the holder in step (ii) and without axially shifting the conductive shield sleeve from the overlapped position in step (i), crimping the conductive shield sleeve over the shield braid and the holder to mechanically retain and lock the angular orientation of the holder and complete a continuous shield path between the cable braid to the holder.

7. The method of claim 1, wherein a pre-overlapped sleeve length exceeds a minimum overlap with the contact holder by at least 2 millimeters to accommodate ΔL.

8. The method of claim 1, wherein no gap remains between a front face of the sleeve and the contact holder after crimping.

9. The method of claim 4, wherein a maximum expected length reduction (ΔLmax) corresponds to ±180° rotation and ≥2 millimeter strain relief extension.

10. The method of claim 1, wherein step (c) comprises crimping the sleeve in a single pressing operation over the shield braid and the contact holder to fix the angular orientation and establish the continuous EMI shielding through the sleeve.

11. The method of claim 1, wherein step (c) comprises crimping the sleeve in the pressing operation over the shield braid and the contact holder to simultaneously fix the angular orientation and establish the continuous EMI shielding through the sleeve.

12. The method of claim 1, wherein step (c) comprises crimping the sleeve in a single pressing operation over the shield braid and the contact holder to simultaneously fix the angular orientation and establish the continuous EMI shielding through the sleeve.

13. The method of claim 6, wherein step (iii) crimping the conductive shield sleeve without subsequent axial repositioning simultaneously locks the angular orientation and completes the continuous shield path from the cable braid to the holder.

14. The method of claim 6, wherein a pre-overlapped sleeve length exceeds a minimum overlap with the holder by at least 2 millimeters to accommodate shortening of the length of the assembly.

15. The method of claim 6, wherein no gap remains between a front face of the conductive shield sleeve and the holder after crimping.

* * * * *